Jan. 14, 1936.   H. A. FRANKLIN   2,028,056
WAVE MOTOR
Filed Nov. 26, 1934   3 Sheets-Sheet 3

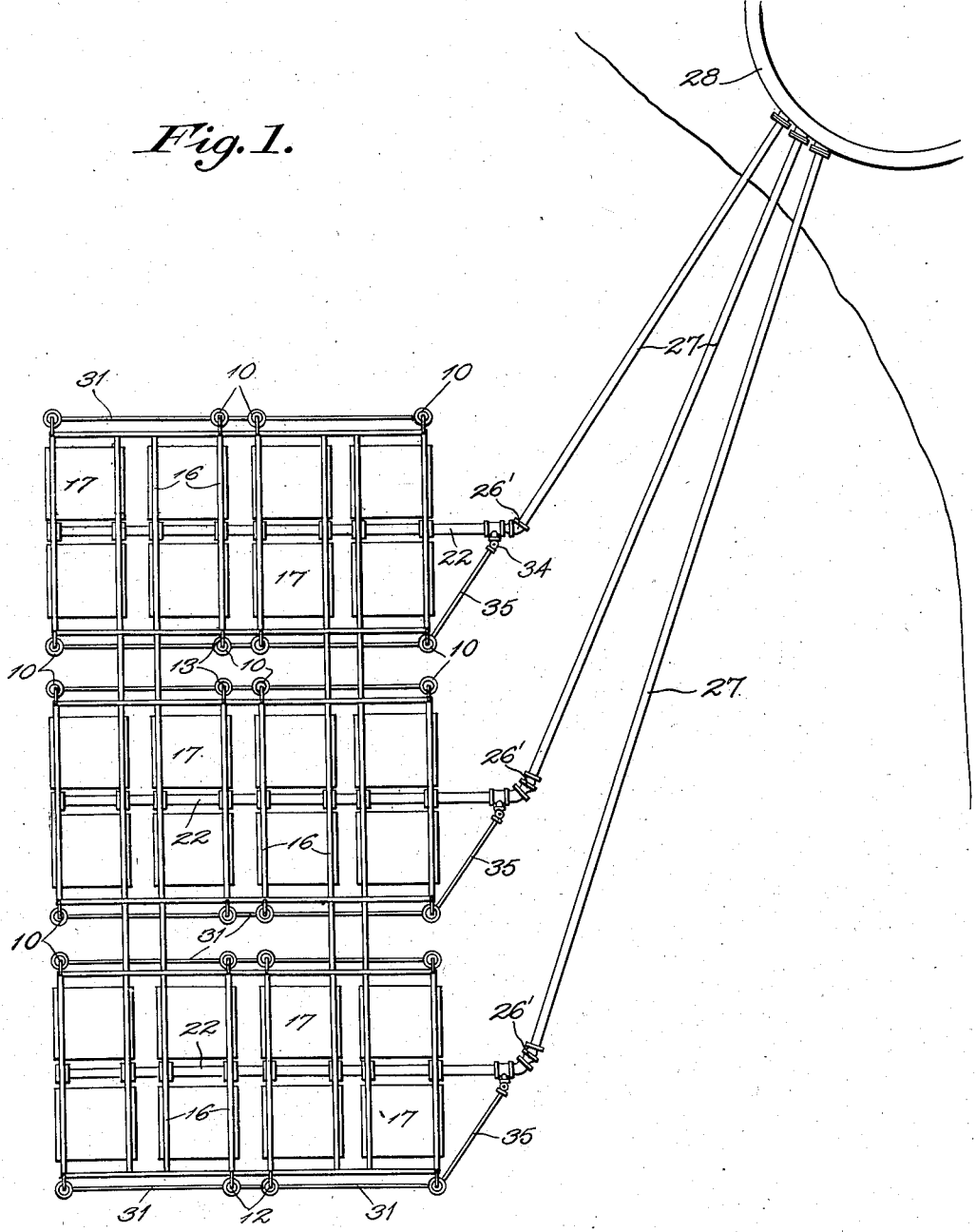

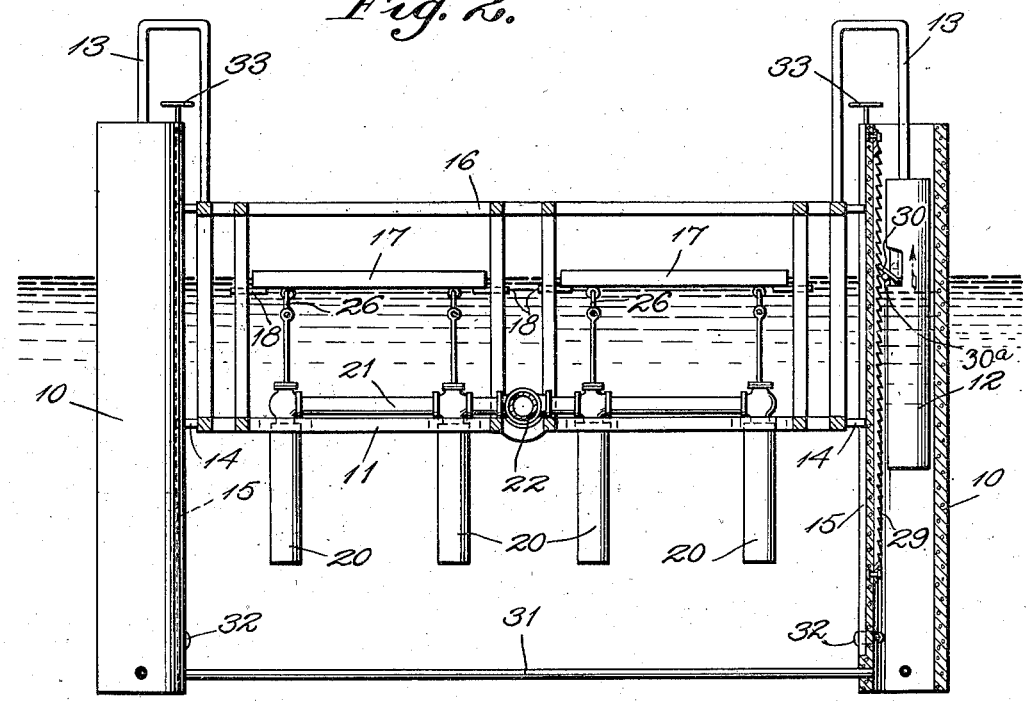
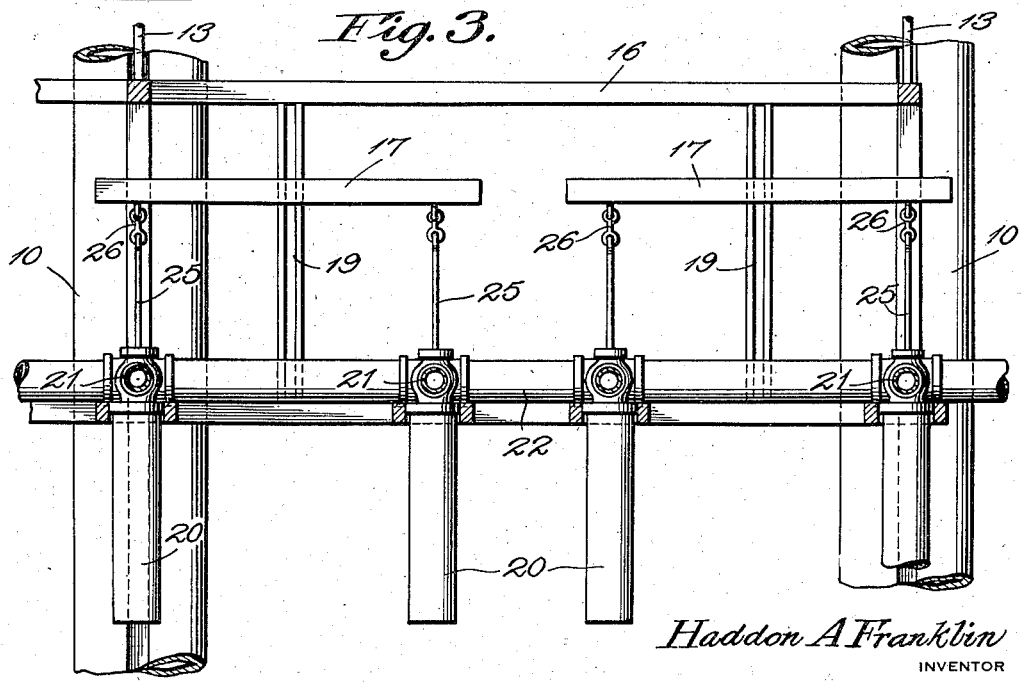

Haddon A. Franklin
INVENTOR

BY Victor J. Evans & Co.
ATTORNEY

WITNESS:

Patented Jan. 14, 1936

2,028,056

UNITED STATES PATENT OFFICE 2,028,056

WAVE MOTOR

Haddon A. Franklin, Cordova, Ala.

Application November 26, 1934, Serial No. 754,879

5 Claims. (Cl. 103—70)

The invention relates to a wave motor and more especially to a sea wave power plant.

The primary object of the invention is the provision of a motor or plant of this character, wherein under the influence of water disturbances, such as waves, power therefrom can be had for the driving of machinery or the like, the motor or plant being of novel construction so as to rise and fall, or under a rolling motion of waves effects operation of pumps for the sending of water under pressure into a storage tank or reservoir for use when desired.

Another object of the invention is the provision of a motor or plant of this character, wherein the floats affected by the motion of water can be automatically set according to a common water level or what might be termed a dead water level and such setting changing according to high or low tide within a body of water.

A further object of the invention is the provision of a motor or plant of this character, wherein the construction thereof is such as to be operated by and to utilize the power of waves for pumping action, so that such power may be transferred to machinery or the like for the operation of the same and thus making the running cost economical and considerably below that incident to the use of engines of motive fuel type.

A further object of the invention is the provision of a motor or plant of this character, which is comparatively simple in its construction, thoroughly reliable and efficient in its operation, strong, durable, economical to operate, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a plan view of a motor or plant constructed in accordance with the invention and showing fragmentarily a reservoir included therewith.

Figure 2 is an enlarged vertical sectional view of the motor or plant.

Figure 3 is a view similar to Figure 2 on a further enlarged scale and taken at right angles thereto.

Similar reference characters indicate corresponding parts throughout the several views in the drawings.

Figure 4:
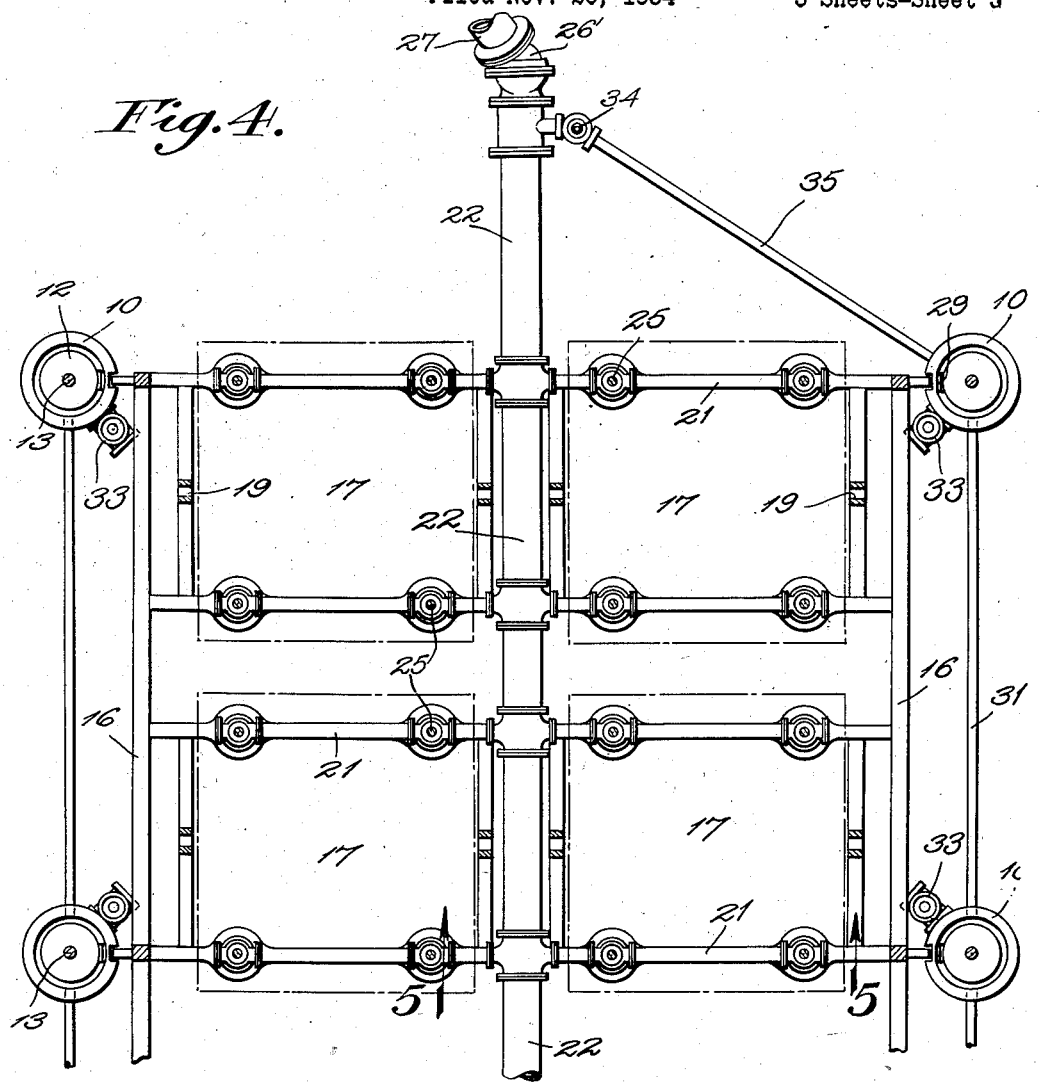
Figure 4 is a fragmentary enlarged plan view partly in section.
Figure 5:
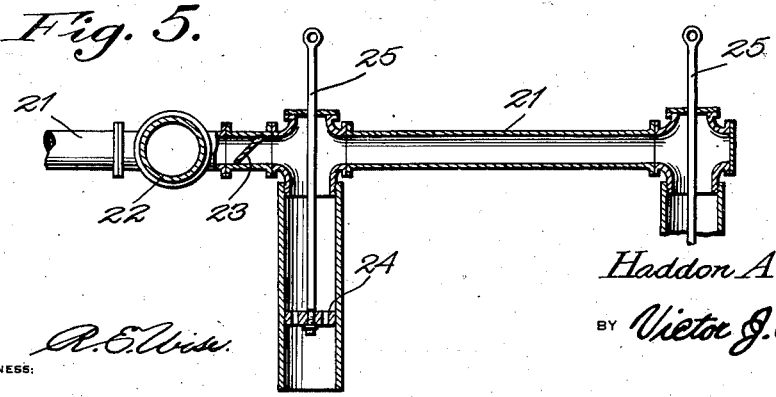
Figure 5 is a fragmentary sectional view taken on the line 5—5 of Figure 4 looking in the direction of the arrows.

Referring to the drawings in detail, the wave motor or plant comprises groups of spaced perpendicular tubiform or cylindrical columns or piers 10, these being located in a body of water and rising from the bed thereof, these columns or piers being open at their upper ends in the respective groups. Located between each group of columns or piers 10 is a vertically movable cradle 11, while located within the columns or piers 10 are floats 12 and those within the respective groups of said columns or piers and companions to the cradles 11 arranged therewith have connection thereto through the medium of hangers 13. Each cradle 11 has guide extensions 14, these operating in guideways 15 formed in and disposed vertically of the columns or piers 10.

Rising from each cradle 11 is a superframe 16 for wave floats 17, these having the guide extensions 18 operating in guideways 19 as provided in the superframe 16. Depending from each cradle 11 is a series of pump cylinders 20, these being coupled to branches 21 of a water main 22, the latter and the said branches 21 being superimposed upon the cradle to be carried thereby. Each branch 21 next to its communication with the main 22 has fitted therein a return check valve 23. Operating within the cylinders 20 are the pump pistons 24, their stems 25 being linked, at 26, to the floats 17.

The water main 22 has the flexible union 26 with a feed conduit 27 leading to a reservoir, a portion 28 only being shown in Figure 1 of the drawings. This reservoir is located on land and is adapted for the storage of water under compression therein for utilization of this water in the operation of machinery or the like.

Arranged within each column or pier 10 is a ratchet toothed rack 29 with which cooperates a float dog 30 carried by the float 12, so that the cradle 11 can be set automatically at a dead water level and be latched relative thereto. The rise and fall of water within the column or pier 10 operates the float dog 30 for the latching and unlatching action thereof, as should be obvious in Figure 2 of the drawings.

To maintain a uniformity of dead water level within the groups of columns or piers 10 there is arranged a piping 31 to each group, so that the columns or piers of this particular group will be in intercommunication with each other through the piping 31. The water from a body thereof is let into the groups of columns or piers 10 through valved inlets 32, each having the manually operable hand wheels 33 extended in convenient reach of the user of the motor or plant and such inlets 32 are of a small size to avoid a water level within the columns or piers 10 resultant from turbulent water conditions and wave activity of the body of water, yet the dead water level within these columns or piers will automatically change according to the change from high to low tide, or vice versa, of the water.

In the operation of the motor or plant the force of waves active upon the floats 17 will operate the pumps by reciprocating the pistons 24 within the cylinders 20 and thus these pumps will force water under pressure through the main 22 and conduit 27 into the reservoir 28 where the stored water under pressure can be utilized for the operation of machinery or the like.

It will be noted that the cradles 11 associated with each group of columns or piers 10 will automatically adjust themselves according to the rise and fall of the tide of a body of water and a dead water level common to the columns or piers of the respective groups will be had in said columns or piers.

In case of repairs being necessary to the motor or plant, the inlets 32 will be closed to the columns or piers 10 and by opening the valve 34 in the branch conduit 35 leading from each conduit 27 to one of the columns or piers 10 of each group, water can be let into such group of columns or piers from the said conduit 27 and thus causing the cradles 11 to rise so that the pumps will be lifted out of the water or raised for convenient access thereto and thus allowing for repairs to be made as the occasion may require.

It is to be understood that the floats 12 within the columns or piers 10 are for setting the cradle 11 according to the tide condition of the body of water without said columns or piers. Assuming that the tide condition of the body of water is at the mean water level indicated in Figure 2 of the drawings within the column or pier 10 the dog 30 due to the fact that it is not submerged within this body of water within the column or pier 10 will be in latched engagement with the rack 29 thus anchoring the cradle 11 so that wave activity of the body of water outside of the columns or piers 10 will play upon the floats 17 causing the operation of the pumps 20. On a change of the tide condition to free the floats 12 within the columns or piers 10 it is necessary that the dogs 30 become submerged in the bodies of water within these piers or columns 10 and these bodies of water present within the columns or piers 10 change under tide conditions so that the cradle 11 is automatically adjusted in conformity with tide changes. It will be apparent from Figure 2 of the drawings that each dog 30 carries a float 30a and the water body within the column or pier 10 is active upon this float to change the position of the dog to either latching or unlatching positions thereof with relation to the rack 29.

It is to be understood that when the floats 17 are riding a mean level of the water the floats 12 within the piers or columns 10 will be in a position to have the dogs 30 submerge so that the wave activity will be directly on the floats 17 and these will rise with the crest of the wave and fall with the latter so that the reciprocatory action of the pumps 20 will be had.

As long as the ratchet dogs 30 are submerged in the water columns within the piers 10 with the dogs beneath a mean water line the latter will be unlatched from the rack 29 and the said floats 12 are free for the rise of the cradle 11 accordingly to the changing of the tide to high water mark and upon low tide change the floats 12 will automatically move downwardly within the columns or piers resultant from gravitation with a lowering of the water within said columns or piers. By the action of the waves without the piers upon these floats 17 has a tendency to relieve the weight of the load from the floats 12 within the said piers 10 and thus the tendency is for these floats 12 to rise within said piers and in this movement the dogs 30 are brought out of submerged condition and dropped into latching engagement with the rack 29 so that the further wave action operates the floats 17 for actuating the pumps.

What is claimed is:

1. A wave motor of the character described comprising a series of hollow piers, a cradle related with said piers and having floats working interiorly of the latter, valved inlet means mounted in the piers, means establishing communication between the series of piers for maintaining a uniform dead water level therein, pumps supported by said cradle, a reservoir having connection with said pumps, and wave operated floats actuating said pumps and carried in the cradle.

2. A wave motor of the character described comprising a series of hollow piers, a cradle related with said piers and having floats working interiorly of the latter, valved inlet means mounted in the piers, means establishing communication between the series of piers for maintaining a uniform dead water level therein, pumps supported by said cradle, a reservoir having connection with said pumps, wave operated floats actuating said pumps and carried in the cradle, and means within the piers and coacting with the floats therein for latching said floats and controlled by the dead water level within the piers.

3. A wave motor of the character described comprising a series of hollow piers, a cradle related with said piers and having floats working interiorly of the latter, valved inlet means mounted in the piers, means establishing communication between the series of piers for maintaining a uniform dead water level therein, pumps supported by said cradle, a reservoir having connection with said pumps, wave operated floats actuating said pumps and carried in the cradle, means within the piers and coacting with the floats therein for latching said floats and controlled by the dead water level within the piers, and branches in the connections between the reservoir and said pumps.

4. A wave motor of the character described comprising a series of hollow piers, a cradle related with said piers and having floats working interiorly of the latter, valved inlet means mounted in the piers, means establishing communication between the series of piers for maintaining a uniform dead water level therein, pumps supported by said cradle, a reservoir having connection with said pumps, wave operated floats actuating said pumps and carried in the cradle, means within the piers and coacting with the floats therein for latching said floats and controlled by the dead water level within the piers, branches in the connections between the reservoir and said pumps, and means for guiding the cradle in its movements.

5. A wave motor of the character described comprising a series of hollow piers, a cradle related with said piers and having floats working interiorly of the latter, valved inlet means mounted in the piers, means establishing communication between the series of piers for maintaining a uniform dead water level therein, pumps supported by said cradle, a reservoir having connection with said pumps, wave operated floats actuating said pumps and carried in the cradle, means within the piers and coacting with the floats therein for latching said floats and controlled by the dead water level within the piers, branches in the connections between the reservoir and said pumps, means for guiding the cradle in its movements, and means for guiding the wave operated floats.

HADDON A. FRANKLIN.